United States Patent Office 3,560,253
Patented Feb. 2, 1971

3,560,253
FIRE RESISTANT COATED MASONRY
STRUCTURAL UNITS
Robert J. Ashton, Toronto, Ontario, Canada, assignor to
SCM Corporation, Cleveland, Ohio
No Drawing. Filed June 19, 1968, Ser. No. 738,099
Claims priority, application Canada, Apr. 27, 1968,
18,627
Int. Cl. C03c 17/32
U.S. Cl. 117—123                                            6 Claims

ABSTRACT OF THE DISCLOSURE

Coated masonry structural units exhibiting unusual fire and flame resistance, and thermal stability are provided. These units comprise a masonry substrate such as concrete or cinder block, coated with a polyester composition containing hydrated alumina as the primary thermal stabilizer and fire retardant. Secondary fire retardants such as antimony can also be employed. The coating is formed by curing a thermosetting polyester composition containing alumina hydrate, unsaturated polyester, and monomeric compound copolymerizable therewith.

---

In the building and related industries today, there is a critical demand for masonry construction blocks, particularly concrete and cinder blocks, for both indoor and outdoor exposure which exhibit unusual resistance to thermal degradation, in addition to possessing and exhibiting excellent hardness, abrasion resistance, toughness, mar resistance, chemical resistance, and wear resistance.

The present invention provides masonry construction units having a hydrated alumina filled polyester coating thereon which economically and effectively fulfills these needs.

Polyesters as coating materials are well known and have attained wide acceptance as a result of their high surface gloss, chemical durability, and abrasion resistance. Unfortunately, polyester coatings, due to their organic nature, are not noted for superior thermal stability.

The present invention provides a masonry block coated with a polyester composition containing hydrated alumina, which block unexpectedly exhibits thermal stability without sacrificing appearance, chemical durability, or abrasion resistance.

In practicing the present invention, any unsaturated polyesters that are copolymerizable into a thermosetting mass can be employed. Such polyesters include polymerizable unsaturated (polyhydric alcohol-polycarboxylic acid) polyesters that are prepared by the reaction of one or more polyhydric alcohols with one or more polybasic acids or anhydrides. Examples of these polyesters are the products prepared by the reaction of alpha-beta, ethylenically unsaturated dicarboxylic acids or anhydrides including maleic, fumaric, citraconic, itaconic, aconitic, mesaconic, chloromaleic, and the like, and mixtures thereof; with a glycol such as ethylene glycol, propylene glycol, diethylene glycol, dipropylene glycol, triethylene glycol, any butylene glycol, pentylene glycol and the like, and mixtures thereof.

According to conventional practice, the anhydrides of these acids, when they exist, can also be used and in certain instances are preferred. It is, of course, essential that in preparing the unsaturated polyester sufficient unreacted double bonds of the dicarboxylic acid are available for subsequent cross-linking with the ethylenically unsaturated monomer. It will be understood that it is often preferred that part of the unsaturated dicarboxylic acids be replaced with a saturated dicarboxylic acid to tailor the performance characteristics of the finished coating.

Such saturated acids or anhydrides include phthalic, isophthalic, terephthalic, oxalic, malonic, succinic, glutaric, sebaccic, adipic, pimilic, suberic, tricarballyic, and the like and mixtures thereof.

High molecular weight polyester resin prepared by reacting isophthalic acid and/or orthophthalic acid with maleic anhydride, and ethylene glycol, propylene glycol, and other diols have been found particularly suitable for the present purposes.

The above described polyester component is well known in the art.

The polyesters described above form thermosetting resin solution by dissolving the unsaturated polyester or mixture of polyesters, in a polymerizable vinyl monomer solvent, and finally cured by free radical catalysis to cross-link with the monomer to form a thermoset co-polymer.

The above described polyester is mixed with monomeric compounds containing a $CH_2=C<$ group. Aromatic monomers such as styrene and vinyl toluene are most frequently utilized as the cross-linking monomer (because of their desirable cross-linking properties), although many other monomers can also be employed. Such other monomers include divinyl benzene, ethyl alpha-methyl styrene, chloro- and fluoro-styrenes, diallyl phthalate, dimethallyl phthalate, triallyl cyanurate, allyl diglycolate, diallyl phenyl phosphonate, diethylene glycol bis (allyl carbonate), 1,2-propylene glycol bis (allyl carbonate), bis (allyl lactate) carbonate, allyl succinyl allyl glycolate, allyl maleate, methallyl maleate, alkyl acrylates such as methyl methacrylate, ethyl methacrylate, methyl acrylate, ethyl acrylate, propyl acrylate and butyl acrylate, vinyl acetate, allyl acetate and the like. In addition to the foregoing monomeric compounds which are merely representative, any $CH_2=C<$ group containing monomer or mixtures of such monomers can be utilized if desired.

The $CH_2=C<$ group containing monomer is ordinarily utilized in an amount comprising 10 to 80% by weight of the copolymerizable mixture of polyester and monomer and preferably in an amount to 20 to 60% by weight.

These copolymerizable mixtures of polyesters and vinylic monomers can, of course, contain additional components such as inhibitors; light stabilizers, such as substituted benzophenones; free radical initiators of the organic type, including methyl-ethyl ketone peroxide, hydrogen peroxide, acetyl benzoyl peroxide, cumene hydropyroxide, benzoyl peroxide, methyl amyl ketone peroxide, lauroyl peroxide, can also be included to intiate copolymerization between the unsaturated polyester and the vinyl monomer. These initiators, when they are used, are employed in an amount ranging from about 0.1% to about 5% by weight of the polyester-monomer to be copolymerized.

Curing promoters and accelerators including a cobalt octoate, and cobalt napthenate are also used in the polyester monomer system to enhance the rapid and uniform curing of the coating.

Small amounts of inorganic fillers such as finely divided silica can also be used to prevent settling in the coating slurry. As mentioned above, ultra-violet light absorbents are also employed in an amount ranging from about 0.1% to about 2% on the weight of polymerizable material, with 0.1% to about 1% being preferred. These additives are used to eliminate and minimize yellowing in the case of light-colored coating but are unnecessary in the darker resin formations. Any light stabilizer compatible with the unsaturated polyester resin can be employed. These include the substituted benzophenones, benzotriazoles, and the like compounds.

The thermal stability and fire resistant features of the coated masonry substrate is derived primarily from the presence of particulate hydrated alumina dispersed throughout the cured polyester matrix. The alumina hydrate content is critical in that if the concentration is too high, the surface properties such as loss and hardness are not realized in the coated masonry block. On the other hand, when the alumina hydrate content is too low, adequate thermal stability is not achieved. It has been found that good thermal stability as well as desirable surface properties are achieved when the cured polyester composition contains about 50% to 80% by weight hydrated alumina.

The reason for the effectiveness of hydrated alumina in this capacity is not presently understood, although it is strongly suspected that the water of hydration is liberated at a temperature where it is most efficient in combatting thermal degradation. Hydrated alumina also tends to enhance the polyester film integrity at elevated temperatures.

Hydrated alumina is a composition generally indicated by the formula $Al_2O_3 \cdot 3H_2O$ or $Al(OH)_3$. On a weight basis this compound contains about 65% aluminum oxide ($Al_2O_3$) and about 35% water. Commercially available grades of the hydrated alumina are quite suitable for present purposes. The hydrated alumina should be finely divided so as to maximize stability of the coated slurry, as well as providing high gloss and surface uniformity in the ultimately coated block.

A typical suitable commercial grade is Hydrated Alumina C-333 sold by Alcoa Chemical Division of Aluminum Company of America. This alumina has an average particle size of about 6.5 to 8.5 microns and a specific gravity of about 2.4.

When desired, additional pigmentation and flame resistance can be achieved through the use of up to 10% by weight of the coating slurry of a finely divided (e.g. 200 mesh) antimony compound such as antimony oxide or antimony silico-oxide. Antimony silico-oxide is a mixture (in weight %) of silicon dioxide (about 50%) and antimony trioxide (about 5%) and antimony tetroxide (about 45%). These antimony compounds improve flame resistance while further minimizing the smoke evolution. When these antimony compounds are used, they are used in quantities of up to 10% by weight, and usually about 4 to 10% by weight based on the coating slurry.

From the foregoing description of the functional components of the coating slurry, it is seen that the coating slurry comprises about 50 to 80% by weight of the hydrated alumina dispersed in about 10 to 50% of the thermosetting solution of an unsaturated polyester resin dissolved in a vinyl monomer copolymerizable therewith; with 100 parts of the copolymerizable mixture of polyester and monomer containing about 10–80 parts (preferably 20–60 parts) of monomer. The coating slurry is then applied to, and cured on, a masonry substrate to provide a cured polyester composition having about the same composition as the coating slurry. The amount of volatiles lost on curing is very small.

The coating slurry can be applied to the masonry substrates by any of the conventional techniques such as brush coating, roller coating, dipping, spraying, etc. Over rough, porous masonry surfaces, a single coat of about 5–10 mils thickness can often fill and bridge irregularities to yield a smooth, glossy, thermally stable surface coating. However, certain types of very porous concrete block may require a prime coat to fill the voids and provide a receptive surface for subsequent top coats.

The prime coat can be the same composition as the top coat, but usually the prime coat is enriched in hydrated alumina, pigments and other fillers at the expense of resin to provide a transitional subsurface layer of desired bulk and hiding qualities. In this capacity, the prime coat provides a strong dense layer capable of supporting the glossy surface layer. This intermediate prime coat is, of course, firmly bonded to both the exposed surface layer (top coat) and the masonry substrate.

In one particularly important embodiment, a plurality of polyester layers are built up on masonry substrates by a gel coating process.

In carrying out the gel coating process, the desired outer surface is provided by applying the above-described alumina hydrate-polyester-monomer slurry to an appropriate mold surface without being fully cured. A prime coat of filled or reinforced polyester is applied on top thereof, and is also gelled without being fully cured. The masonry block to be coated is applied on top of the gelled, but uncured prime coat. The entire assembly so built up, is then heat treated to cure the various resin layers simultaneously, to give a masonry block having the multiple layers integrally bonded to each other and the masonry block. This process is known in the art as gel coating and is more fully described in U.S. Pat. 2,817,619.

In order to permit those skilled in the art to better understand the practice of the present invention, the following examples are given. These examples are, of course, for the purpose of illustration and all parts and percentages are by weight unless otherwise specified.

EXAMPLE 1

Thermal stability of a substrate coated with an ordinary polyester coating

This example will serve as a control on thermal stability of an ordinary polyester coating on a building block.

A standard unsaturated polyester resin was prepared as follows:

Into a stirred, heated reactor is charged 0.59 moles of propylene glycol, 0.55 moles of diethylene glycol, 0.45 moles of maleic anhydride and 0.55 moles of isophthalic acid. The reaction mass is maintained at about 350° to 400° F. for several hours until the unsaturated polyester resin thus formed has an acid number of about 15–20.

Seventy parts of this resin is diluted in 30 parts of styrene to form a thermosetting resin solution. One part of methyl ethyl ketone peroxide (free radical initiator) is added to this resin solution.

This resin solution is then applied to the face of an ordinary concrete construction block, by spreading a uniform coating of about 5–8 mils in thickness thereon. The polyester coating is then cured at about 350° F. for about ½ hour.

This coated block is then subjected to the ASTM (American Society for Testing Materials) test E–84. This is a standardized test method designed to evaluate the surface burning characteristics of building materials. This test is designed to evaluate the thermal stability of a material by measuring, among other things, the density of the smoke developed when the material is exposed to a test fire. This measurement is based on the output of a photoelectric cell, wherein the cell output is directly proportional to the amount of light received from a light source. The light source and the photocell are positioned so that the light beam must pass through the smoke emergent from the test specimen. The smoke density index is then calculated from the light beam measurement with higher index values indicating thicker smoke.

The smoke density index of the test block, coated with the standard polyester coating, is about 150–160 as measured by the ASTM method.

EXAMPLE 2

Fire retardant polyester coating composition

Sixty parts of the unsaturated polyester resin prepared in Example 1 is diluted with 40 parts of styrene to form a thermosetting resin solution. A fire retardant coating composition is then prepared by vigorously mixing 198 parts of the resin solution with 50 parts of powdered antimony silico-oxide and 6.9 parts of a finely divided silica suspending agent, sold by Cabot Corporation under the name Cab-O-Sil, for 5 minutes. While the mixing continues, 543 parts of hydrated alumina (Grade C–333 sold by Alcoa), 34.5 parts of industrial grade styrene, 75.0 parts of industrial grade methyl methacrylate, and 3 parts of cobalt octoate (promoter) are slowly added. Eightytwo (82) parts of a standard polyester resin (made from 1.1 mole of propylene glycol, 0.5 mole of maleic anhydride and 0.5 mole of phthalic anhydride) is added to assure thorough wetting of the alumina hydrate in the resin solution.

The resulting polyester resin slurry has the composition in percent by weight:

| | Percent |
|---|---|
| Isophthalic polyester resin (Example 1) | 19.8 |
| Hydrated alumina | 54.3 |
| Styrene | 3.4 |
| Methyl methacrylate | 7.5 |
| Antimony silico oxide | 5.0 |
| Silica suspending agent (Cab-O-Sil) | 1.5 |
| Cobalt octoate | 0.3 |
| Polyester resin (propylene glycol-maleic anhydride, phthalic-anhydride resin) | 8.2 |

EXAMPLE 3

Substrate coated with the fire retardant coating of Example 2

The fire retardant coating composition prepared in Example 2 is applied to, and cured on, the facing of a concrete construction block according to the method of Example 1. The resulting block has a tough, hard, and glossy polyester coating thereon. The thermal stability of the coated block is then evaluated by the ASTM method of Example 1. The smoke density index is about 15–20. This represents a significant improvement in thermal stability as indicated by a decrease in the amount of smoke liberated.

EXAMPLE 4

Preparation of a polyester prime coat slurry

A polyester resin slurry is prepared by vigorously mixing 574.7 parts of the polyester resin of Example 1 with 334.0 parts of hydrated alumina (Grade C-333 by Alcoa) to form a slurry. To this slurry is added 0.2 parts of cobalt octoate, 1.3 parts of 2-hydroxy-4-n-octoxybenzophenone (ultraviolet light absorber), 20.0 parts of cellulose acetate butyrate (leveling agent) and 56.7 parts of methyl methacrylate. The resulting slurry is stable and translucent, and has the following composition in weight percent:

| | Percent |
|---|---|
| Isophthalic polyester resin (Example 1) | 57.5 |
| Hydrated alumina | 33.4 |
| Methyl methacrylate | 5.7 |
| Leveling agents, wetting agents, promoters, ultraviolet absorber | 3.4 |

EXAMPLE 5

Substrate coated with a prime coat and top coat

The polyester resin slurry of Example 2 is catalyzed with 1% of methyl ethyl ketone peroxide (1% based on the weight of resin slurry). This catalyzed resin slurry is sprayed into a clean metal tray (that had been previously treated with a silicone mole release agent) to a depth of about 5–10 mils. This spray coating converts to a firm gel upon standing 10–20 minutes at room temperature. This coating will form the topcoat on the subsequently coated substrate.

The polyester prime coat slurry prepared in Example 4 is catalyzed with about 1–2% of methyl ethyl ketone peroxide (based on the weight of resin slurry) and is then added to the tray to form a thin layer (about 5–10 mils) over the gelled layer already present in the tray. A masonry concrete construction block is then positioned in the tray with one face thereof resting upon the resinous layers. The tray containing the two polyester layers is then heated at about 350° to 400° F. for about 45 minutes to fully cure the polyester topcoat as well as the polyester prime coat, bonding them to each other and to the masonry block. After this period, the block is removed from the tray. The block is observed to have a tough, glossy, weather-resistant and thermally stable polyester coating thereon.

The thermal stability of the coated block is then evaluated by the ASTM method of Example 1. The smoke density index is about 25. This represents a significant improvement in thermal stability over a masonry block, having a conventional polyester coating thereon.

This example demonstrates that thermal stability can be achieved in a coated block having thereon a dual polyester coating. In this example, the prime coat contains less alumina hydrate (and more resin) than the topcoat and functions as a transition layer between the porous block surface and the topcoat in that gloss, mar resistance, and hiding power are enhanced. The prime coat does not increase the thermal stability but is sometimes required to fulfill other specifications such as gloss, color, hardness etc.

This example shows that thermal stability can be achieved even when a prime coat is employed.

In the foregoing examples, both the prime coat and the top coat contain hydrate alumina. In certain applications it is not necessary for all the coating layers to contain hydrated alumina. For instance, the prime coat can contain hydrated alumina while the top coat does not. Alternatively, the top coat can contain hydrated alumina while the prime coat does not. When there are more than two layers, there are many more combinations of alumina hydrate filled layers and unfilled layers.

The examples are directed to concrete blocks as the coated masonry unit. This is a preferred embodiment, although masonry units such as brick, tile, stone, light weight foamed refractory block, cinder block, terra cotta and similar masonry products can also be coated according to the present invention.

What I claim as my invention is:

1. A coated masonry unit having a tough, hard, chemically resistant, glossy, resinous coating of improved thermal stability thereon at least the major depth of said coating being a layer of cured polyester composition containing about 10% to 50% of a thermoset polyester-vinyl monomer polymer matrix having dispersed therein about 50% to 80% finely divided hydrated alumina.

2. A coated masonry unit wherein there are a plurality of superimposed layers of cured thermosetting polyester compositions, at least the surface layer of which is the cured polyester composition of claim 1.

3. The coated masonry unit of claim 1 wherein said polyester-monomer, polymer contains the equivalent of about 10 to 80 parts of monomer per 100 parts of said polymer.

4. The coated masonry unit of claim 1 wherein said polyester-monomer, polymer contains the equivalent of about 20 to 60 parts of monomer per 100 parts of said polymer, and said monomer is at least partially aromatic.

5. The masonry unit of claim 1 wherein said substrate is a concrete block and the thin coating is about 5 to 10 mils in thickness.

6. The masonry unit of claim 1 wherein said polyester composition contains up to about 10% of an antimony oxide-containing fire retardant.

References Cited

UNITED STATES PATENTS

| 2,984,635 | 5/1961 | Harris | 117—123DX |
| 3,013,903 | 12/1961 | Bugosh | 117—161X |
| 3,333,970 | 8/1967 | Green | 117—137X |
| 3,376,155 | 4/1968 | O'Donnell | 117—123X |

ALFRED L. LEAVITT, Primary Examiner

D. A. SIMMONS, Assistant Examiner

U.S. Cl. X.R.

106—15; 117—123, 137; 252—8.1